United States Patent Office

3,695,892
Patented Oct. 3, 1972

3,695,892
METHOD OF PRODUCING AN IMPROVED FLAVORED POULTRY PRODUCT
William C. Reinke, University City, Mo., assignor to Ralston Purina Company, St. Louis, Mo.
No Drawing. Filed Apr. 21, 1970, Ser. No. 30,584
Int. Cl. A22c 21/00
U.S. Cl. 99—107                                          5 Claims

ABSTRACT OF THE DISCLOSURE

An improved flavored poultry product, such as turkey, and process for producing same is disclosed. Parts such as necks, backs, and deboned carcasses are cooked in water to obtain a broth, such as turkey broth. The substantially clear liquid portion of the broth is then separated from the fat, mixed with other flavoring materials, and injected into the carcass of the whole birds.

BACKGROUND OF THE INVENTION

The art is familiar with presently available products which are designated "self-basting." These products consist of injecting a large quantity of edible fat or butter into the poultry so that during cooking the fat serves to enable a nice browning reaction to occur to the skin surface area of the poultry. However, when utilizing processess which inject edible fat into the carcass meat, a high degree of disruptive action or muscle distortion occurs. Primarily, this is due to the fact that the poultry is substantially an aqueous system, and is being presented with a non-aqueous system, i.e., fat. Thus, pockets of fat or large areas of fat are developed within the carcass meat such that upon subsequent cooking, the meat is not able to completely compensate for the distortion and gaps or voids are exhibited in the muscle meat upon slicing.

In addition, the injection of these fats, such as butter, serves to produce an artificial flavor or taste so that the true poultry flavor is not realized.

In addition, it has been well known to inject aqueous solutions having materials of the phosphate monosodium glutamate and gelatin type associated with natural or artificial flavoring or seasoning materials. However, flavoring solutions of this type utilizing an aqueous carrier such as water have the undesirable or disadvantageous feature of altering the flavor of the poultry so that the true flavor was not realized. The resultant poultry product had a watered down flavor or sensation.

SUMMARY OF THE INVENTION

An improved flavored poultry product and method for producing same which comprises the steps of preparing a broth from poultry parts and/or meat thereof, separating the fat portion of the broth from the substantially clear portion thereof, adding a small percentage of other flavoring materials to the clear portion to form an aqueous flavoring solution and injecting a predetermined amount of the aqueous flavoring solution into the poultry. The poultry product so produced has improved flavor and moistness which enables the eater to derive an improved flavor throughout it, due to the utilization of an aqueous system which permits better distribution of the flavoring solution added to such poultry product.

It is, therefore, the principal object of the present invention to provide a poultry product having an aqueous flavoring solution therein which produces improved moistness of the breast portion of poultry and yet does not adversely affect the flavor of such poultry product.

Another object of the present invention is to provide a method for producing a poultry product by injecting into said poultry a flavor solution which does not substantially disrupt or deleteriously affect the muscle portion of the breast meat of poultry.

Another object of the present invention is to provide a method for preparing a flavored poultry product utilizing turkey broth without the normal problem of shortened storage life due to oxidative rancidity developing from the fat content of turkey broth.

These and other objectives of the present invention will become more apparent in the description which follows hereafter.

DESCRIPTION OF THE PREFERRED EMBODIMENT

This invention is directed to the method of making an improved flavored poultry product and more particularly is directed to improving the flavor of whole turkeys. Since the preparation of turkeys by the consumer normally requires preparation in a particular manner which may serve to produce a drying effect of the turkey meat, attempts have been made to render the breast meat of turkey more moist and juicy. Therefore, applicant's invention is described in terms of preparing a whole turkey product, but is not intended to be limited thereto as the same process could be utilized in preparing other poultry products, such as chickens, ducks, pheasants, etc. In addition, the flavoring material could be injected into poultry parts as well as further processed poultry products, such as rolls or roasts to obtain improved moistness or juiciness thereof without adversely affecting the flavor.

In preparing turkeys according to the present process, the residual parts of the turkey such as necks and/or backs are placed in a vat containing water. Normally, the necks and/or backs would constitute between 5 to 20% by weight of the material contained in the vat and preferably there would be 11% necks and/or backs and 89% water in the vat. The vat containing this mixture is then simmered for 1–3 hours and preferably this is carried out by heating to 205°–210° F. for 1½ hours such that the various constituents of the turkey backs and/or necks are extracted into the water. After this cooking time, the bones and any meat clinging thereto are removed from the vat and water is supplied to said vat to bring the volume of material contained therein back to its initial level.

It should be realized that other residual portions of the turkeys may be utilized in preparing the turkey broth other than necks and backs and the selection of these materials will be dependent upon the availability of parts to the operator and also his desire as to the level of materials he wishes to utilize in preparing the broth. For example, deboned carcasses may also be utilized in preparing the turkey broth; however, the amount of deboned carcasses which would be utilized would be in the range of 15 to 30% by weight of the material in the vat and preferably the vat mixture would consist of 22% by weight of deboned carcasses and 78% by weight of water.

After the components in the vat have been cooked and the bones removed therefrom, the material is allowed to set or settle for a predetermined period of time. This settling procedure is necessary to allow the turkey fat, which is extracted during the cooking, to rise to the top of the vat resulting in a substantially clear turkey broth flavoring material in the bottom of the vat below the fat layer. It is necessary that the fat be separated from the flavoring portion since presence of the fat in the flavoring material, when injected into the turkey, would serve to increase the possibility of oxidative rancidity or off-flavor development in the turkey during storage. By following this separation step or procedure, it is possible to substantially eliminate or prevent the inclusion of this fat material in the injected solution so that the off-flavors or rancidity normally attendant with turkey fat do not develop in he injected turkey. After a predetermined period of time, this separation will be complete. The time for the separation will depend on the volume of material in the vat and vat configuration, but should be for at least a sufficient period of time such that a clear demarcation is visible between the fat and the substantially clear turkey broth flavoring portion. The substantially clear flavoring portion is then drawn from the bottom of the vat and placed in a second container.

To this second container are added minor amounts of other well known additives such as phosphates, salts, monosodium glutamate, and a variety of flavoring materials. It has been found desirable that the substantially clear flavoring portion of the turkey broth constitute between 80 and 90% by weight of the final flavoring solution for injection. Preferably, the turkey broth will constitute 88% by weight of this solution so that it is clear that an aqueous flavoring material is being added to the turkey. The utilization of the turkey broth flavoring material permits an improved flavor and maintains the white meat of the turkey more juicy and tender so that this meat does not dry out quickly during cooking. In addition, the use of turkey broth to improve the moistness of the turkey meat does not result in the turkey meat having a watered down flavor or sensation as is obtained when utilizing a water based flavoring solution.

The flavoring solution, in addition to the substantially clear turkey broth portion, would have added thereo salt at a level of approximately 0.5% to 4% by weight to add to the flavor. In addition, a phosphate would be added of approximately 2% to 6% by weight for its known affect of retarding oxidative changes in the turkey meat and of retaining the juiciness of the meat. Other flavoring materials may be added; however, it is important to keep the turkey broth level in the 80% to 90% by weight range of the total flavoring solution. Further, the addition of butter or yellow fats should be avoided since their presence tends to produce an undesirable color in the white meat of the turkey.

After the flavoring solution has been prepared as previously described, it is injected into the breast meat of poultry through the use of needles as is well known in the art. The level of solution injected should be within the range of 1% to 7% by weight of the carcass and preferably should be within 2% to 3% by weight of the carcass. It has been found that when too much of the flavoring solution is added, the product becomes too moist or juicy and the high level of phosphates which would be present would tend to produce a metallic flavor so that the product becomes less palatable. However, by maintaining the injection of flavoring solution at the previously specified range and particularly near 3% by weight of the carcass, the breast meat becomes more juicy and tender and an improved flavor is produced in the turkey. After injection, the product may then be frozen and handled in the normal manner of conventional turkey processing.

It should be noted that when utilizing the aqueous flavoring solution as described herein, that the carcass may be cooled to about 40 to 50° F. and the injection solution maintained at about 40 to 45° F. so that upon injection the material will not increase the internal temperature of the turkey carcass. Further, it has been found that by moving the poultry skin prior to injection, such that after injection the skin may be moved back to cover the openings created by injection, the skin serves to prevent the flavoring material from exuding from the turkey carcass. If desired, it is possible to use a higher temperature for the aqueous flavoring solution; however, it may then be necessary to include a small amount of gelatin so that the injected solution will be retained within the carcass. The decision as to whether or not a gelatin material will be utilized in the injection solution will depend on the operator's preference. However, it should be realized that when injecting the flavoring solution at a high temperature or when using a high melting point fat, the internal temperature of the turkey carcass would be raised, which increases the possibility of bacteria multiplication in the carcass. A high degree of care must be exercised in rapidly chilling the turkey carcass following a high temperature injection to prevent this increase of bacteria count. For this reason, it is preferable to inject the flavoring solution at a temperature of approximately 40°–45° F. as previously disclosed.

Upon cooking, the turkey product of the present invention has exhibited substantially the same percentage of yield as is exhibited by turkeys which are not prepared with the flavoring solution. In addition, it appears that the cook-off or the drippings of the turkey are richer in turkey flavor so that an improved gravy may be made therewith. As previously described, the injection of the turkey broth serves only to supply natural juices of the turkey and, therefore, a superior or natural flavor is produced in the white meat of the turkey. This serves to eliminate the artificial flavor which is normally produced with turkeys which are injected with a fat or oil for basting purposes. In addition, it has beeen observed during the development of this process that the breast portion of the turkey is not substantially disrupted and the occurrence of voids are minimized where the flavoring solution has been injected. It is believed that since the flavoring solution being injected is of an aqueous nature that a more complete distribution of the flavoring solution is achieved throughout the bird so that large pockets of material which would be foreign to the turkey meat, i.e., such as fat are not developed.

In order to better understand the present invention, the following examples are given:

EXAMPLE 1

A flavoring solution was formed by placing 11 pounds of necks and backs in a vat of 89 pounds of water. This material was immersed at 210° F. for 1½ hours. The necks and backs were removed and water added to bring the level of the liquid in the vat back to its original level. The vat was then allowed to stand for approximately 10 minutes at which point a separation was clearly visible between the fat portion and the substantially clear liquid broth portion. The clear turkey broth was then drained from the bottom of the vat and placed in a second container. A solution was then prepared which consisted of the following:

88.1% clear turkey broth
4.2% phosphates
4.2% white butter buds
2.1% salt
1.4% hydrolyzed plant protein This flavoring solution was then injected into the breast portion of a turkey carcass at a level of 3% by weight of the carcass. The bird was frozen and stored. Upon cooking the turkey, the breast meat exhibited an improved flavor and appeared to be more moist and juicy than the breast meat of a turkey prepared without the addition of the flavoring solution.

EXAMPLE 2

The process of Example 1 was substantially duplicated except that 22 pounds of deboned carcasses and 78 pounds of water were placed in the vat to prepare the turkey broth. The resulting product was substantially identical to that of Example 1.

In view of the foregoing, it is now apparent that a novel poultry product and process for preparing same has been described and that those skilled in the art may make certain changes or modifications in the process without departing from the spirit of the invention.

I claim:

1. The method of producing an improved flavored poultry product comprising the steps of: forming a broth by simmering a mixture of poultry parts and water for a period of time of about 1 to 3 hours to form the desired broth, separating the poultry parts and fat from said broth to obtain a substantially clear broth flavoring material, forming an aqueous injection solution with said substantially clear broth flavoring material being present in a range of approximately 80%–90% thereof, said aqueous injection solution also including approximately .5%–4% salt and approximately 2–6% phosphates, and injecting the aqueous flavoring solution into the poultry product at a level of about 1%–7% by weight of the poultry product the temperature of said poultry product and the temperature of said aqueous flavoring solution being controlled so that the internal temperature of the poultry product is not increased when the aqueous flavoring solution is injected into said poultry product, and freezing the injected poultry product.

2. The method according to claim 1 wherein the aqueous flavoring solution is injected at a level of approximately 2% to 3% by weight of the carcass.

3. The method according to claim 1 wherein the poultry is turkey and the broth is formed by utilizing parts of a turkey.

4. The method according to claim 3 wherein the step of forming the turkey broth comprises placing deboned carcasses in a vat with water, the deboned carcasses being present in the range of about 15%–30% by weight of the material in the vat, simmering the contents of the vat for a period of time of 1–3 hours to extract the turkey constituents therefrom and removing the deboned carcasses from the vat and allowing the broth to settle in the vat for a sufficient period of time to obtain a clear separation between the fat and the substantially clear broth portion.

5. The method according to claim 3 including the steps of placing poultry parts selected from the group consisting of backs and necks into a vat with water, the backs and necks being present in the range of about 5%–20% by weight of the material contained in the vat, heating the contents of the vat for a period of time of 1–3 hours to extract the turkey constituents therefrom, removing the poultry parts from the vat and allowing the broth to settle in the vat for a sufficient period of time to obtain a clear separation between the fat and the substantially clear broth portion.

References Cited
UNITED STATES PATENTS

| | | | |
|---|---|---|---|
| 2,128,952 | 9/1938 | Mareta | 99—107 |
| 3,010,829 | 11/1961 | Turner | 99—107 |
| 3,035,508 | 5/1962 | Nelson | 99—107 X |
| 3,366,491 | 1/1968 | Schwall et al. | 99—107 |

HYMAN LORD, Primary Examiner

U.S. Cl. X.R.

99—194